(12) United States Patent
Chankaya et al.

(10) Patent No.: US 9,963,223 B2
(45) Date of Patent: May 8, 2018

(54) AERODYNAMIC FORCE SENSING APPARATUS

(75) Inventors: Kurt M. Chankaya, Keller, TX (US); Brant H. Maines, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1850 days.

(21) Appl. No.: 13/007,099

(22) Filed: Jan. 14, 2011

(65) Prior Publication Data
US 2012/0185181 A1 Jul. 19, 2012

(51) Int. Cl.
*G06F 19/00* (2018.01)
*B64C 23/06* (2006.01)

(52) U.S. Cl.
CPC ........... *B64C 23/076* (2017.05); *Y02T 50/164* (2013.01)

(58) Field of Classification Search
CPC .................................................... B64C 23/065
USPC ............. 702/33, 44; 244/76 C, 82, 194, 195, 244/199.1–199.4; 73/170.01
See application file for complete search history.

(56) References Cited

U.S. PATENT DOCUMENTS

| | | | | |
|---|---|---|---|---|
| 2,986,033 | A * | 5/1961 | Spencer | ........................... 73/180 |
| 3,830,449 | A | 8/1974 | Schoffmann | |
| 4,591,111 | A | 5/1986 | Laughter | |
| 4,671,473 | A * | 6/1987 | Goodson | .................... 244/199.4 |
| 5,082,207 | A | 1/1992 | Tulinius | |
| 5,186,415 | A | 2/1993 | Li | |
| 6,012,675 | A | 1/2000 | Cocatre-Zilgien | |
| 6,073,084 | A * | 6/2000 | Le Tron | .......................... 702/94 |
| 6,345,790 | B1 * | 2/2002 | Brix | ........................... 244/199.4 |
| 6,526,821 | B1 * | 3/2003 | Corda et al. | .................... 73/186 |
| 6,766,981 | B2 * | 7/2004 | Volk | ............................. 244/76 C |
| 7,395,705 | B2 | 7/2008 | Greene | |
| 7,487,937 | B2 | 2/2009 | Ifju et al. | |
| 2002/0173217 | A1 | 11/2002 | Kinkade | |
| 2003/0183721 | A1 | 10/2003 | Wilson | |
| 2005/0287386 | A1 * | 12/2005 | Sabol et al. | ................... 428/543 |
| 2007/0120006 | A1 * | 5/2007 | Hubard et al. | .............. 244/35 R |
| 2008/0001028 | A1 * | 1/2008 | Kendall et al. | .............. 244/75.1 |
| 2010/0100260 | A1 * | 4/2010 | McIntyre et al. | ................. 701/6 |

FOREIGN PATENT DOCUMENTS

| | | |
|---|---|---|
| EP | 0257123 | 3/1988 |
| GB | 1393696 | 5/1975 |
| JP | 4108094 | 4/1992 |
| WO | 199932963 | 7/1999 |

(Continued)

OTHER PUBLICATIONS

Steven Vogel, Wingtip Feathers Increase Aerodynamic Efficiency: Flying Birds. Comparative Biomechanics: Life's Physical World. Princeton: Princeton University Press. 2003. 580 p.

*Primary Examiner* — John Breene
*Assistant Examiner* — Yaritza H Perez Bermudez
(74) *Attorney, Agent, or Firm* — Reising Ethington P.C.

(57) ABSTRACT

An aerodynamic force sensing apparatus for providing an air data computer with information to calculate air data. The apparatus includes a plurality of vanes supportable in a vane array extending from a distal end of an airfoil of an aircraft, and one or more sensors configured to sense the response of one or more vanes of the vane array to aerodynamic forces and to transmit corresponding signals to an air data computer (ADC) for use by the ADC in calculating air data.

36 Claims, 5 Drawing Sheets

(56) References Cited

FOREIGN PATENT DOCUMENTS

| WO | WO 9932963 A1 | * | 7/1999 |
| WO | 2007126405 | | 11/2007 |
| WO | WO 2010008133 A1 | * | 1/2010 |

* cited by examiner

AERODYNAMIC FORCE SENSING APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

This invention relates generally to an aerodynamic force sensing apparatus for providing an air data computer with information to calculate air data, e.g., angle of attack, sideslip angle, dynamic pressure, and/or airspeed.

Description of the Related Art including Information Disclosed under 37 CFR 1.97 and 1.98

Micro air vehicles (MAVs) present special problems for air data calculation because they operate in the near-earth, below rooftop/tree-top environment where chaotic turbulence is common. A MAV may be in a severe downdraft at one moment, a tailwind the next, and an updraft after that. Yet MAVs are so small and light that conventional sensor systems are too heavy and/or bulky and unsuited for accurate operation at the slow airspeeds at which MAVs typically operate. Small, lightweight sensors capable of providing accurate information to an air data computer (ADC), even at low airspeeds, would enable a MAV aerodynamic control system to respond and compensate more rapidly and effectively to gusts, updrafts, downdrafts, wind shears, and other phenomena affecting aerodynamic stability and control.

Aerodynamic force sensors are known for use in providing air vehicle onboard air data computers (ADCs) with information that ADCs need to calculate air data, e.g., angle of attack, sideslip angle, dynamic pressure, and/or airspeed. Known aerodynamic force sensors include angle-of-attack (AOA) sensors, angle-of-slip (AOS) sensors, and wingtip vortex angle sensors, with AOA being defined as the acute angle between the chord of an airfoil and a line representing the undisturbed relative airflow or relative wind, AOS being defined as the acute angle between an aircraft centerline and a line representing the relative wind, and vortex angle being defined as the angle between a circular vortical helix and its vortical axis.

It's also known for glider-type aircraft to comprise bird-like wings and arrays of wingtip feather-like structures. Also, radio-controlled bird models are known to include pivotably-mounted tip feather arrays actuable to provide active aerodynamic control of the models.

BRIEF SUMMARY OF THE DISCLOSURE

An aerodynamic force sensing apparatus for providing an air data computer with information to calculate air data. The apparatus includes a plurality of vanes supportable in a vane array extending from a distal end of an airfoil of an aircraft, and a first sensor configured to sense the response of a first vane of the vane array to aerodynamic forces and to transmit corresponding signals to an air data computer (ADC) for use by the ADC in calculating air data.

The first vane or a portion of the first vane may be deflectable in proportional response to aerodynamic forces acting upon the first vane, and the first sensor may be configured to sense deflection of the first vane and to transmit corresponding signals to an ADC.

The first vane may comprise a flexible portion configured to bend in proportional response to aerodynamic forces acting upon the first vane, and the first sensor may be configured to sense bending stresses in the first vane and to transmit corresponding signals to an ADC.

The first sensor may comprise an electro-mechanical material configured to detect vane deflection and/or bending stresses and to generate corresponding signals to be transmitted to an ADC programmed to compute air data based on a calibration of the measured deflection and/or stress to an angle of interest. The angle of interest may be AOA or AOS. The electro-mechanical material may comprise a piezoelectric material and/or an electroactive polymer material.

The apparatus may include an ADC programmed to calculate air data in response to signals received from the first sensor. The ADC may be programmed to compute air data based on a calibration of measured vane deflection and/or vane bending stress to an angle of interest such as AOA or AOS.

A second vane of the plurality of vanes may comprise a second sensor that may be configured to sense the response of the second vane and to transmit corresponding signals to the ADC. The ADC may be programmed to determine an angle of interest by calculating a ratio of forces or moments aerodynamically induced in the first vane, to forces or moments aerodynamically induced in the second vane. The ADC may also or alternatively be programmed to compute dynamic pressure and/or indicated airspeed from AOA and from vertical load factor data received from an accelerometer carried by an aircraft carrying the apparatus.

One or more vanes or vane portions may be configured to capture energy from wingtip vortices. The vane or vanes or vane portions may be shaped and positioned to extend into and at least partially conform to a portion of a vortical flowpath of a wingtip vortex such that the wingtip vortex imparts aerodynamic forces to the at least one vane in a desired direction.

One or more vanes or vane portions may be configured to augment static stability, e.g., by being swept aft.

One or more vanes of the vane array may be configured to generate active aerodynamic control inputs to generate aerodynamic forces for maneuvering, i.e., may be movable to provide control authority. Movable vane or vane portions may be rotatably supported at respective inner ends of the vanes or vane portions on a distal outer end of an airfoil of an aircraft. The apparatus may also include a vane driver configured to drive one or more of the rotatably supported vanes or vane portions in rotation to effect vehicle roll inputs in response to commands.

One or more vanes or vane portions may be configured to provide passive aerodynamic control of a vehicle by, for example, being movable and/or bendable in proportion to aerodynamic forces acting upon them, to enhance aerodynamic characteristics, e.g., to reduce drag by increasing compliance with and reducing resistance to aerodynamic forces developed by wingtip vortices generated by airfoils of an aircraft carrying the apparatus.

One or more of the vanes may have an airfoil shape that may be symmetric or asymmetric.

Also, a method is provided for calculating air data. According to this method, an apparatus is provided comprising a plurality of vanes supportable in an array extending from an aircraft airfoil. Also provided is a first sensor configured to sense the response of a first vane of the array to aerodynamic forces. The first vane's response to aerodynamic forces is sensed and corresponding signals are generated and used to calculate air data. The sensing of the first vane's response to aerodynamic forces may include sensing deflection of and/or bending stresses in the first vane.

The calculation of air data may be based on a calibration of measured vane deflection and/or vane bending stress to an angle of interest. Dynamic pressure and/or airspeed may be calculated from AOA and from vertical load factor data received from an accelerometer. AOA may be calculated from a ratio of forces or moments aerodynamically induced in the first vane of the array and forces or moments aerodynamically induced in a second vane of the array.

Active aerodynamic control inputs may be generated by manipulating one or more vanes or vane portions, which may include rotatably supporting one or more vanes at respective inner ends of the vanes on an airfoil of an aircraft, and then driving the rotatably supported vanes in rotation to effect vehicle roll inputs in response to commands. One or more vanes may be moved to a swept position to improve higher speed flight characteristics and may be moved to an unswept position to improve lower speed flight characteristics.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

An aerodynamic force sensing apparatus for providing an air data computer (ADC) with information for use in calculating air data, e.g., angle of attack (AOA), sideslip angle (AOS), dynamic pressure (Q), and/or airspeed is generally shown at 10 in FIGS. 1-6. The apparatus 10 may include a plurality of wingtip extensions or vanes 14-22, which may be supported at respective vane inner ends in two generally linear or curvilinear arrays 12 extending laterally outward from along edges 23 of respective distal ends of airfoils such as wings 24 of an aircraft 25. The distal ends of the airfoils are outboard of and/or distal with respect to a center line 33 of the aircraft 25. The vanes 14-22 of one or both of the two arrays 12 may be oriented generally crosswise to the relative wind 15, i.e., such that, in flight, the relative wind 15 impacts respective leading edges of the vanes 14-22 of one or both of the arrays 12. In the embodiment shown in the drawings there are five vanes 14-22 in each array 12.

Figure 1:
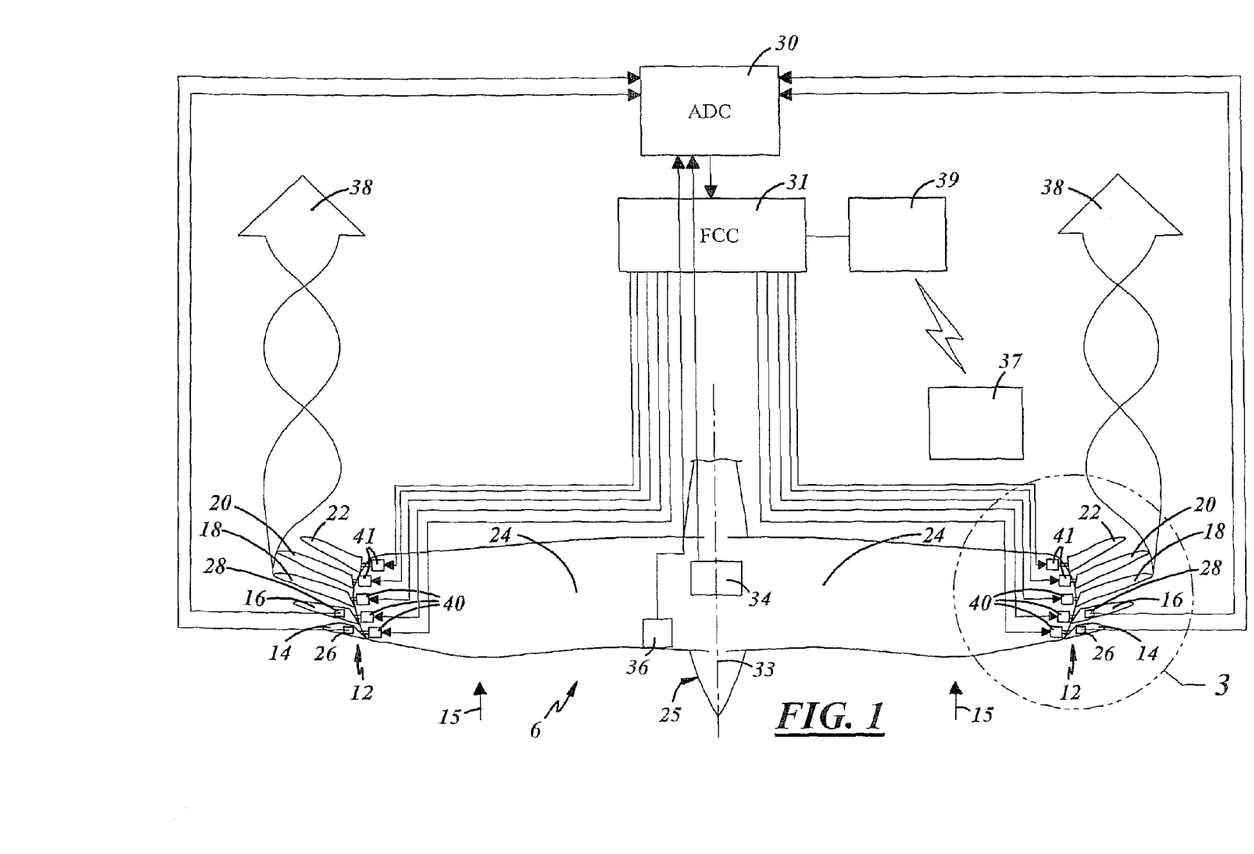
FIG. 1 is a schematic top view of two aerodynamic force sensing apparatuses carried by a micro air vehicle (MAV), with an onboard flight control computer (FCC) and air data computer (ADC) of the MAV shown outside the MAV outline for clarity.
Figure 3:
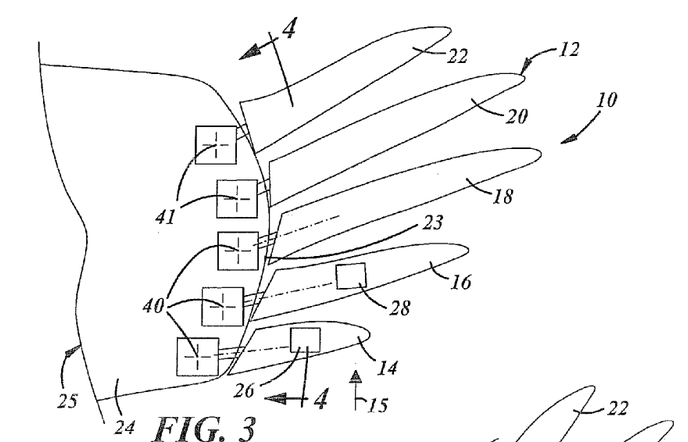
FIG. 3 is a schematic magnified view of one of the two aerodynamic force sensing apparatus of FIG. 1 shown with a vane array of the apparatus in a splayed, unswept state.
Figure 5:
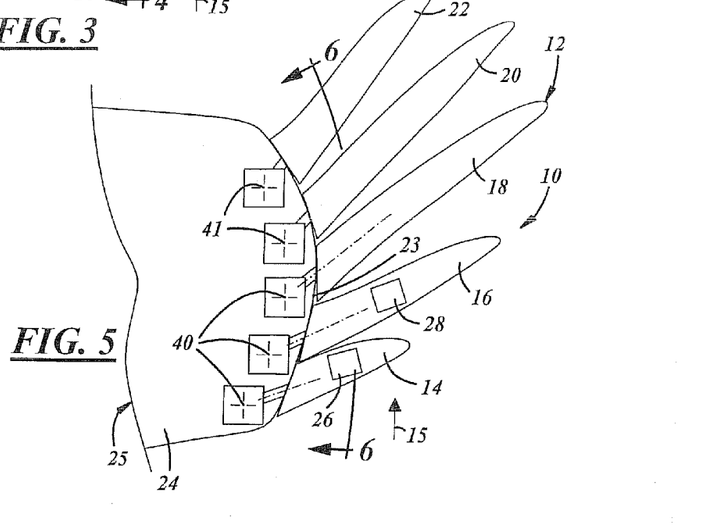
FIG. 5 is a schematic magnified view of one of the two aerodynamic force sensing apparatus of FIG. 1 shown with a vane array of the apparatus in a swept state.

As shown in FIGS. 1, 3, and 5, one or both of the vane arrays 12 of the apparatus 10 may also include a first sensor 26 that may be carried by and configured to sense the response of at least a first vane 14 of one or both of the arrays (not necessarily "first" in line) to aerodynamic forces imparted to the first vane 14 by the relative wind 15 and to generate and transmit corresponding signals to an air data computer (ADC) 30 for use by the ADC in calculating air data such as angle of attack, sideslip angle, dynamic pressure, and/or airspeed.

At least a portion of at least the first vane 14 of at least one of the arrays 12 may be deflected in proportional response to aerodynamic forces acting upon the first vane 14. The first sensor 26 of one or both of the arrays 12 may be configured to sense and/or measure such aerodynamically-induced vane deflection and transmit corresponding signals to an ADC 30. The first sensor 26 may be carried by the first vane 14 as shown in FIGS. 1, 3, and 5; or may be carried by the wing 24 supporting the first vane 14, in a position to sense deflection of the first vane 14.

One or more of the vanes 14-22 may comprise a flexible portion configured to bend in proportional response to aerodynamic forces acting upon one or more of the vanes 14-22. The flexible portion may comprise the entirety of one or more of the vanes 14-22. In the embodiment shown in the drawings, the entirety of each of the vanes 14-22 of one or both of the arrays 12 are flexible and configured to bend in proportional response to aerodynamic forces. The first sensor 26 of one or both of the arrays 12 may be carried by any flexible vane 14-22 or vane portion and may be configured to sense and/or measure aerodynamically-induced vane bending stresses in whichever vane or vanes or vane portions the first sensor 26 is carried by, and to transmit corresponding signals to the ADC 30. In the embodiment shown in the drawings the first sensor 26 carried by the first vane 14 of one or both of the arrays 12 is configured to sense vane bending stresses in addition to vane deflection, and to transmit corresponding signals to the ADC 30.

The first sensor 26 of one or both of the vane arrays 12 may comprise an electro-mechanical material configured to detect vane deflection and/or bending stresses and to generate corresponding signals to be transmitted to the ADC 30. The electro-mechanical material may comprise a piezoelectric, or alternatively, an electroactive polymer material. In the embodiment shown in the drawings, the entirety of the vanes 14 that carry the first sensor 26 of one or both of the arrays 12, respectively, comprise this electro-mechanical material.

The ADC 30 may be programmed to compute air data based on a calibration of measured vane deflection and/or stress to an angle of interest. The angle of interest may be a relative airflow angle such as AOA or AOS, with AOA being defined as the acute angle between a chord of the airfoil 24, and a line representing an undisturbed relative airflow or relative wind 15 and AOS being defined as the acute angle between an aircraft centerline 33 and a line representing the relative wind 15.

As shown in FIGS. 1, 3, and 5, one or both of the vane arrays 12 may comprise a second sensor 28 configured to sense the response, e.g., deflection and/or bending stresses, imparted to a second vane 16 of one or both of the arrays 12 by aerodynamic forces, and to transmit corresponding signals to the ADC 30. The ADC 30 may be programmed to determine an angle of interest (such as AOA and/or AOS) independent of airspeed by calculating a ratio of forces or moments aerodynamically induced in the first vane 14 of one or both of the arrays 12 and sensed by the first sensor 16 of one or both of the arrays 12, to forces or moments aerodynamically induced in the second vane 16 in one or both of the arrays 12 and sensed by the second sensor 28 of one or both of the arrays 12.

In other words, by measuring the forces or moments on each of two different vanes of an array 12, angle of attack and/or sideslip angle of the array can be determined based on a ratio (F1:F2; M1:M2) of force (F1) or moment (M1) measurements taken from a first 14 of the two vanes, to force (F2) or moment (M2) measurements taken from a second vane 16 of the two vanes of the array. Since the determination of an angle of interest such as AOA or AOS is based on a ratio between readings from the two vanes, such determinations are generally independent of changes in conditions, such as G loading, airspeed, and aircraft attitude, which increase or decrease the absolute values of individual vane force or moment readings. While the absolute values of the readings may vary greatly, the ratio will remain generally constant despite such transients because the two vanes are located in close enough proximity to experience transient environmental conditions virtually simultaneously. The ADC 30 may determine an overall aircraft AOA or AOS by, for example, averaging the AOA or AOS readings from one or both of the arrays 12.

The ADC 30 may also or alternatively be programmed to compute dynamic pressure (Q) from AOA and from vertical load factor (Nz) (transverse G) load data received from an accelerometer 34 carried by the aircraft 25 according to the equation $Q=n_z W/SC_L$, where Q=dynamic pressure, $n_z$=normal load factor (transverse G), W=aircraft gross weight, S=wing area, and $C_L$=coefficient of lift (with $n_z W$=Lift).

The ADC 30 may also be programmed to compute indicated airspeed (VIAS) from dynamic pressure (Q) values calculated as described above, and from pressure altitude values obtained from an altimeter 35 carried by the aircraft 25 as shown in FIG. 1. The ADC 30 may be further programmed to compute calibrated airspeed (VCAS) from VIAS by obtaining static pressure information from a static pressure sensor 36 carried by the aircraft 25 as shown in FIG. 1. Either dynamic pressure or indicated airspeed values may be referenced in making flight control calculations, as is well known in the art.

Figure 2:
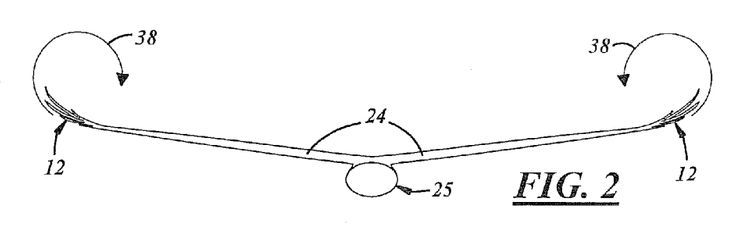
FIG. 2 is a schematic front view of the two force sensing apparatuses and MAV of FIG. 1.

At least a portion of at least one vane of one or both of the vane arrays 12 may be configured to reduce drag, i.e., to enhance the ratio of lift to drag (L/D) over a range of AOAs by capturing energy from wingtip vortices 38. As best shown in FIGS. 1 and 2, one or more of the vanes 14-22 of one or both of the arrays 12 may be shaped and positioned to extend into and at least partially conform to—rather than impede or disrupt—respective portions of respective vortical flowpaths of respective wingtip vortices 38 such that the respective wingtip vortices 38 impart aerodynamic forces to the vanes 14-22 in a desired direction, e.g., upwardly directed force contributing to lift being generated by the airfoil 24.

At least one vane of one or both of the arrays 12 of the plurality of vanes may be configured to generate, or contribute to, active aerodynamic control inputs i.e., to generate aerodynamic forces for maneuvering. In other words, at least a portion of at least one vane of one or both of the arrays 12 of the plurality of vanes may be movable to provide control authority. In the embodiment shown in the drawings, and as is best shown in FIGS. 3-6, the first, second, and third vanes 14, 16, 18 of one or both of the vane arrays 12 are movable to provide control authority. One or both of the vane arrays 12 may include one or more vane drivers 40, 41 (servos) and at least one vane of one or both of the arrays 12 may be rotatably supportable at an inner end of the vane on a distal end of an airfoil supporting the vane. In the embodiment shown in the drawings, the first, second, and third vanes 14, 16, 18 of one or both of the vane arrays 12 may be rotatably supported along the wingtips of the respective wings 24 of the aircraft 25, and one or both of the vane arrays 12 may include roll/sweep input vane drivers 40 operatively connected to the respective first, second, and third vanes 14, 16, 18, and sweep-only input vane drivers 41 operatively connected to the respective fourth and fifth vanes 20, 22. The roll/sweep vane drivers 40 may be configured to drive the first, second, and third vanes 14, 16, 18, in rotation to provide roll control inputs to the aircraft 25.

Figure 4:
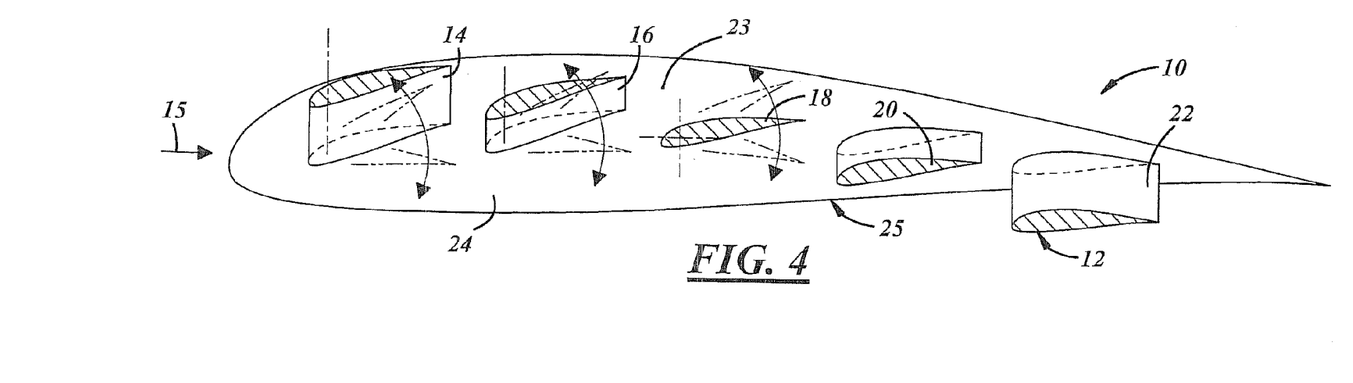
FIG. 4 is a schematic side view of the aerodynamic force sensing apparatus shown in FIG. 3 and with ranges of rotation of the three leading vanes shown in phantom.
Figure 6:
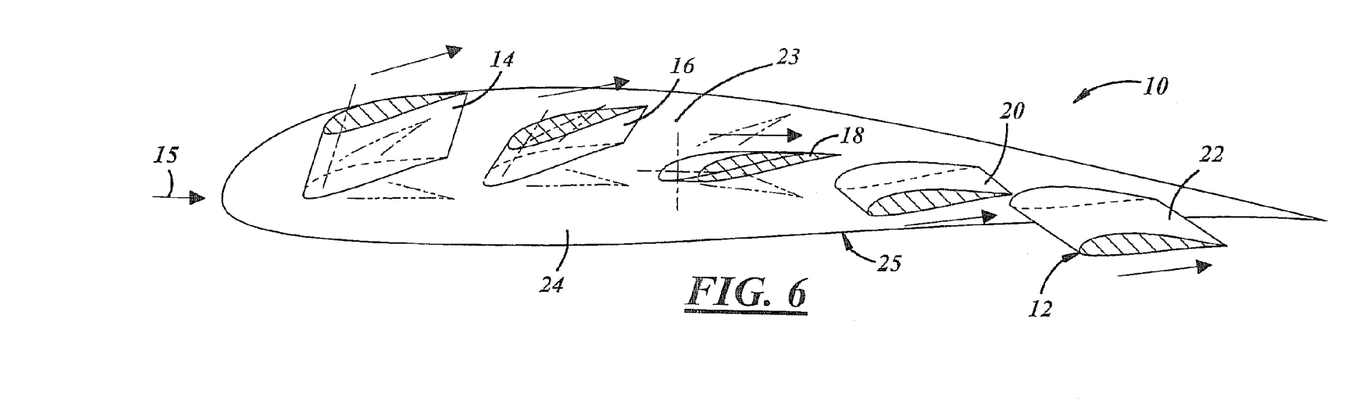
FIG. 6 is a schematic side view of the aerodynamic force sensing apparatus shown in FIG. 5 and with ranges of rotation of the three leading vanes shown in phantom.

At least a portion of at least one vane 14-22 of the plurality of vanes may be configured to augment static stability. In the present embodiment, all vanes 14-22 in both vane arrays 12 are configured to contribute to the augmentation of static stability. More specifically, and as best shown in FIGS. 3-6, all vanes 14-22 in both vane arrays 12 may be unswept (as shown in FIGS. 3 and 4) for low speed flight, or swept aft (as shown in FIGS. 5 and 6) for high speed flight. The vanes 14-22 may be swept and unswept by both the roll/sweep vane drivers 40 for the forward three vanes 14-18, and the sweep-only vane drivers 41 for the aft two vanes 20, 22 of one or both of the arrays 12.

Figure 8:
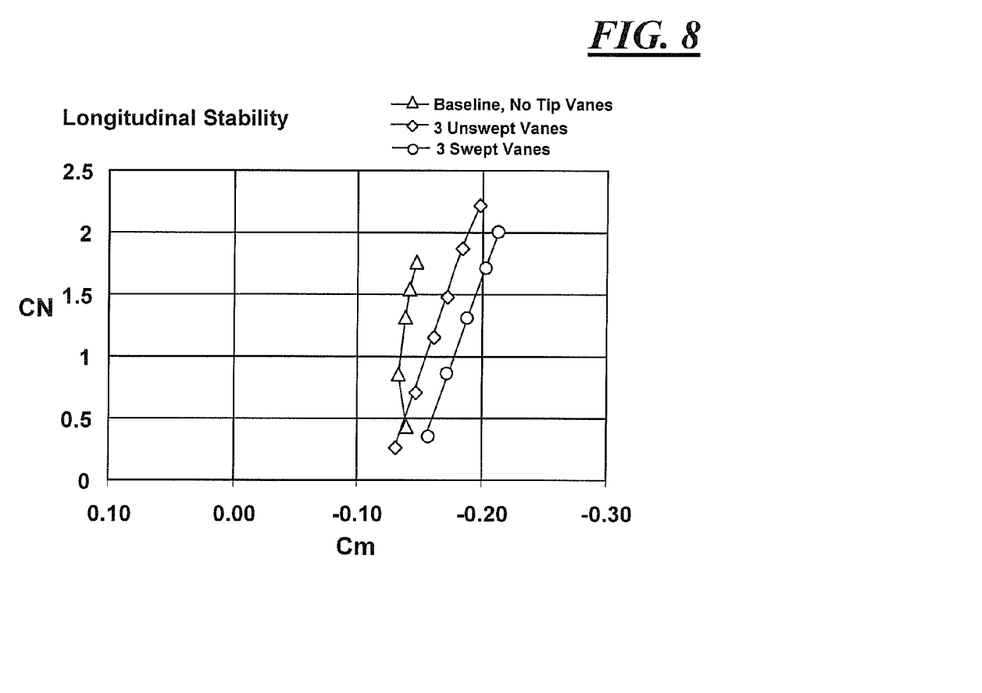
FIG. 8 is a graph comparing longitudinal stability of a wingtip having tip vanes, having unswept tip vanes, and having swept tip vanes.

Through computer modeling it has been determined that the presence of the wingtip vane arrays 12 improves static stability and that the configuration or relative positioning of the vanes 14-22 within each wingtip vane array 12 can further improve static stability. In FIG. 8, which graphs normal force coefficient (CN) versus pitching moment coefficient (Cm), improved longitudinal stability is indicated by a decrease in the slope of a line connecting computer model data points, where slope equals rise/run. Referring to FIG. 8, it's apparent that the lines connecting data points obtained with either swept or unswept wingtip vanes 14-22 present has a slope significantly less than that of the line connecting data points obtained without wingtip vanes present. It's also apparent that there is a significant shift in pitching moment between the swept and unswept vanes. The shift in pitching moments indicates that tip vane sweep may be used to control vehicle pitch attitude.

Figure 9:
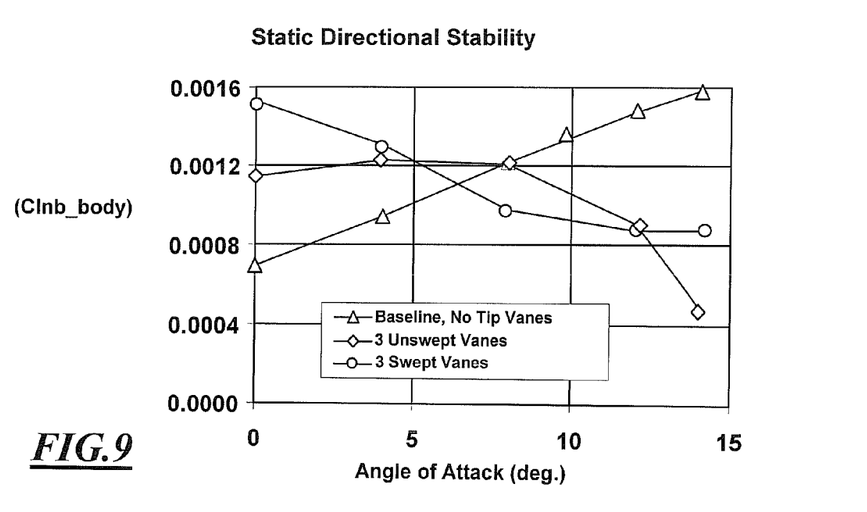
FIG. 9 is a graph comparing static directional stability of a wingtip having tip vanes, having unswept tip vanes, and having swept tip vanes.

Referring now to FIG. 9, which graphs static directional stability against AOA, it's apparent that wingtip arrays 12 having unswept vanes 14-22 improve static directional stability below approximately 8 degrees AOA, and that wingtip arrays 12 having swept vanes 14-22 improve static directional stability below approximately 6.5 degrees AOA. As is also shown in FIG. 9, below approximately 5 degrees AOA, swept wingtip vanes provide an improvement in directional stability over that provided by unswept wingtip vanes in an amount that continues to increase as AOA decreases to zero.

As shown in FIG. 1, the vane drivers 40, 41 may be configured to drive the respective vanes 14-22 in response to commands received from an onboard flight control computer (FCC) 31, and/or a remote control system 37. The apparatus 10 may also include a receiver or transceiver 39 connected to the FCC 31, which may be configured to receive control inputs from the remote control system 37, and/or to transmit information to the remote control system.

At least a portion of at least one vane of one or both of the arrays 12 of the plurality of vanes may be configured to provide, or contribute to, passive aerodynamic control of a vehicle. Accordingly, at least a portion of at least one vane of one or both of the arrays 12 of the plurality of vanes may be configured to move in proportion to aerodynamic forces acting upon it to enhance aerodynamic characteristics, e.g., reduce drag, by increasing compliance with, and reducing resistance to aerodynamic forces developed by wingtip vortices 38. To this end, at least one vane may comprise a flexible portion configured to bend in proportion to aerodynamic forces acting upon it. In the embodiment shown in the drawings, all five vanes 14-22 of one or both of the vane arrays 12 are configured to both move and to bend in proportion to aerodynamic forces acting upon them in such a way as to enhance aerodynamic characteristics.

As shown in FIGS. 4 and 6, one or more of the vanes of one or both of the arrays 12 may have an airfoil shape, which may be an asymmetric lift-generating airfoil shape. Other embodiments may include vanes having any suitable airfoil shape to include symmetric airfoil shapes.

Figure 7:
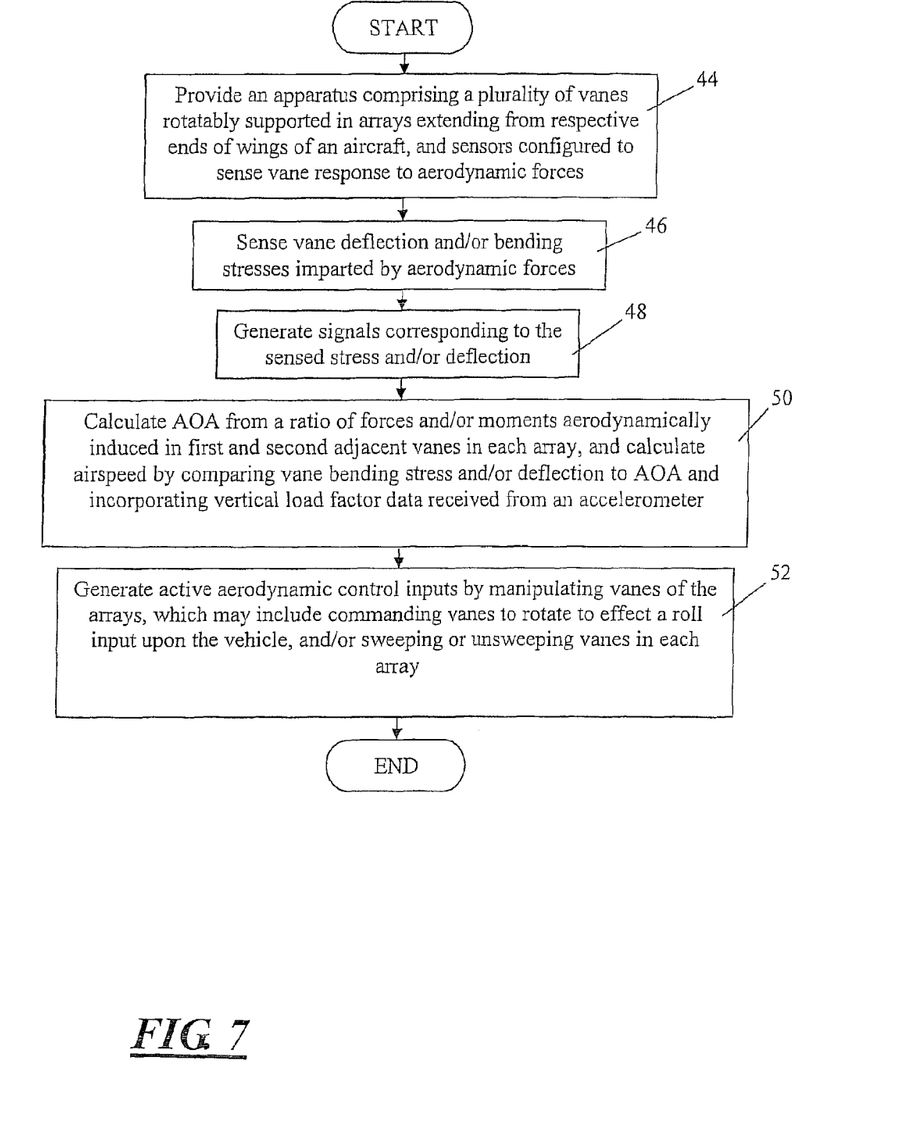
FIG. 7 is a process flow chart showing a method for calculating air data related to an air vehicle and providing aerodynamic control inputs to the vehicle.

In practice, and as shown in FIG. 7 air data may be calculated by first providing, as shown in action step 44, an aircraft such as a micro air vehicle (MAY) 25 with a plurality of vanes 14-22 rotatably supported in arrays 12 extending from respective distal ends of an aircraft's wings 24, and with sensors 40, 41 configured to sense the response of at least some of the vanes 14, 16 to aerodynamic forces as shown in action step 46 and to generate corresponding signals as shown in action step 48.

As indicated by action step 50, air data, such as angle of attack, sideslip angle, dynamic pressure, and/or airspeed, may then be calculated based on the signals. The air data may be calculated based on a calibration of measured vane deflection and/or vane bending stress to an angle of interest (such as AOA or AOS). For example, dynamic pressure (Q) may be calculated from AOA and vertical load factor (Nz) data received from an accelerometer 34, and AOA may be calculated from a ratio of forces or moments aerodynamically induced in the first vane 14 of one or both of the arrays 12 and forces or moments aerodynamically induced in a second vane 16 of one or both of the arrays.

As shown in action step 52, active aerodynamic control inputs may be generated by manipulating at least one vane 14-22 of the plurality of vanes, which may include driving at least one vane of one or both of the arrays 12 in rotation to effect vehicle roll inputs, sweeping the vanes of one or both of the arrays aft to improve high speed flight characteristics, and/or unsweeping the vanes of one or both of the arrays to improve low speed flight characteristics.

An aircraft equipped with the described apparatus experiences less energy loss when maneuvering, augmented lift, and improved aerodynamic sensing compared to aircraft equipped with conventional instruments and lacking wingtip vanes. The apparatus also allows an aircraft, such as a micro air vehicle (MAV), to more closely resemble a bird when covert operation is required, and to respond more effectively to gusts, updrafts, downdrafts, wind shears, and other phenomena affecting aerodynamic stability and control.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An aerodynamic force sensing apparatus for providing an air data computer with information to calculate air data, the apparatus comprising:
    a plurality of vanes supportable in a vane array extending from a distal end of an airfoil of an aircraft; and
    a first sensor connected to a first vane of the vane array and configured to sense the response of the first vane of the vane array to aerodynamic forces and to transmit corresponding signals to an air data computer (ADC) for use by the ADC in calculating air data.

2. An aerodynamic force sensing apparatus as defined in claim 1 in which:
    at least a portion of the first vane is deflectable in proportional response to aerodynamic forces acting upon the first vane; and
    the first sensor is configured to sense deflection of the first vane and to transmit corresponding signals to an ADC.

3. An aerodynamic force sensing apparatus as defined in claim 2 in which the first sensor comprises an electro-mechanical material configured to detect deflection of the first vane and to generate corresponding signals to be transmitted to an ADC programmed to compute air data based on a calibration of the measured vane deflection to an angle of interest.

4. An aerodynamic force sensing apparatus as defined in claim 1 in which:
    the first vane comprises a flexible portion configured to bend in proportional response to aerodynamic forces acting upon the vane; and
    the first sensor is configured to sense resultant bending stresses in the first vane and to transmit corresponding signals to an ADC.

5. An aerodynamic force sensing apparatus as defined in claim 4 in which the first sensor comprises an electro-mechanical material configured to detect bending stresses in the first vane and to generate corresponding signals to be transmitted to an ADC programmed to compute air data based on a calibration of the measured vane bending stress to an angle of interest.

6. An aerodynamic force sensing apparatus as defined in claim 1 in which the first sensor comprises an electro-mechanical material.

7. An aerodynamic force sensing apparatus as defined in claim 6 in which the electro-mechanical material comprises a piezo-electric material.

8. An aerodynamic force sensing apparatus as defined in claim 6 in which the electro-mechanical material comprises an electroactive polymer material.

9. An aerodynamic force sensing apparatus as defined in claim 1 in which the apparatus includes an ADC programmed to calculate air data in response to signals received from the first sensor.

10. An aerodynamic force sensing apparatus as defined in claim 9 in which the ADC is programmed to compute air data based on a calibration of at least one of measured vane deflection or vane bending stress, to an angle of interest.

11. An aerodynamic force sensing apparatus as defined in claim 9 in which:

the apparatus includes a second sensor configured to sense the response of a second vane of the array and to transmit corresponding signals to an ADC; and the ADC is programmed to determine an angle of interest by calculating a ratio of at least one of a force or a moment aerodynamically induced in the first vane, to at least one of a force or a moment aerodynamically induced in the second vane.

12. An aerodynamic force sensing apparatus as defined in claim 10 in which the ADC is programmed to compute dynamic pressure from angle-of-attack (AOA) and load factor data received from an accelerometer carried by an aircraft carrying the apparatus.

13. An aerodynamic force sensing apparatus as defined in claim 1 in which at least a portion of at least one vane of the vane array is configured to capture energy from wingtip vortices.

14. An aerodynamic force sensing apparatus as defined in claim 13 in which the at least one vane is shaped and positioned to extend into and at least partially conform to a portion of a vortical flowpath of a wingtip vortex generated by an airfoil carrying the apparatus such that the wingtip vortex imparts aerodynamic forces to the at least one vane in a desired direction.

15. An aerodynamic force sensing apparatus as defined in claim 1 in which at least a portion of at least one vane is configured to augment static stability.

16. An aerodynamic force sensing apparatus as defined in claim 15 in which the at least one vane is swept aft.

17. An aerodynamic force sensing apparatus as defined in claim 1 in which at least one vane is configured to generate active aerodynamic control inputs.

18. An aerodynamic force sensing apparatus as defined in claim 1 in which:

the apparatus includes a vane driver; and at least one vane is rotatably supportable at an inner end of the vane on a distal end of an airfoil of an aircraft, and the vane driver is configured to drive the at least one vane in rotation to effect roll inputs to the aircraft in response to commands.

19. An aerodynamic force sensing apparatus as defined in claim 18 in which at least a portion of at least one vane of the vane array is movable to provide control authority to an aircraft carrying the apparatus.

20. An aerodynamic force sensing apparatus as defined in claim 1 in which at least a portion of at least one vane of the vane array is configured to provide passive aerodynamic control of an aircraft carrying the apparatus.

21. An aerodynamic force sensing apparatus as defined in claim 20 in which at least a portion of at least one vane of the vane array is configured to move in proportion to aerodynamic forces acting upon it.

22. An aerodynamic force sensing apparatus as defined in claim 20 in which at least one vane comprises a flexible portion configured to bend in proportion to aerodynamic forces acting upon it.

23. An aerodynamic force sensing apparatus as defined in claim 1 in which at least one of the vanes has an airfoil shape.

24. An aerodynamic force sensing apparatus as defined in claim 23 in which at least one of the vanes has an asymmetric lift-generating airfoil shape.

25. A method for calculating air data, the method including the steps of:

supporting a plurality of vanes in an array extending from an airfoil of an aircraft;

connecting a sensor to a first vane of the plurality of vanes;

sensing the response of a first vane of the plurality of vanes, to aerodynamic forces;

generating corresponding signals; and calculating air data based on the signals.

26. The method of claim 25 in which the step of sensing the first vane's response to aerodynamic forces includes sensing deflection of the first vane.

27. The method of claim 26 in which the step of calculating air data based on the signals includes calculating air data based on a calibration of measured vane deflection to an angle of interest.

28. The method of claim 25 in which the step of sensing the first vane's response to aerodynamic forces and generating corresponding signals includes sensing bending stresses in the first vane.

29. The method of claim 28 in which the step of calculating air data includes calculating air data based on a calibration of measured vane bending stress to an angle of interest.

30. The method of claim 25 in which the step of calculating air data includes calculating airspeed and/or dynamic pressure from angle-of-attack (AOA) and from vertical load factor data received from an accelerometer carried by an aircraft carrying the apparatus.

31. The method of claim 25 in which the step of calculating air data includes calculating angle-of-attack (AOA) from a ratio of forces or moments aerodynamically induced in the first vane of the array and forces or moments aerodynamically induced in a second vane of the array.

32. The method of claim 25 including the additional step of generating active aerodynamic control inputs by manipulating at least one vane of the array.

33. The method of claim 32 in which:

the method includes the additional step of rotatably supporting the at least one vane at an inner end of the vane on an airfoil of an aircraft; and the step of generating active aerodynamic control inputs includes driving the at least one vane in rotation to effect aircraft roll inputs in response to commands.

34. The method of claim 32 in which the step of generating active aerodynamic control inputs includes moving at least a portion of the at least one vane relative to an aircraft carrying the apparatus, to provide aircraft control authority.

35. The method of claim 32 in which the step of generating active aerodynamic control inputs includes moving at least one vane of the array to a swept position.

36. The method of claim 32 in which the step of generating active aerodynamic control inputs includes moving at least one vane of the array to an unswept position.

* * * * *